United States Patent [19]

deWeaver, III

[11] Patent Number: 4,479,396
[45] Date of Patent: * Oct. 30, 1984

[54] PROPULSION SYSTEM

[76] Inventor: Fred deWeaver, III, 1403 Tampa Ave., Dayton, Ohio 45408

[*] Notice: The portion of the term of this patent subsequent to Oct. 18, 2000 has been disclaimed.

[21] Appl. No.: 337,781

[22] Filed: Jan. 11, 1982

Related U.S. Application Data

[63] Continuation-in-part of Ser. No. 229,681, Jan. 29, 1981, Pat. No. 4,409,856.

[51] Int. Cl.³ .............................................. F16H 27/00
[52] U.S. Cl. ..................................... 74/84 R; 74/5.37; 74/84 S; 74/194; 74/DIG. 4; 180/7.1
[58] Field of Search ................... 74/84 R, 84 S, 5.22, 74/5.34, 5.37, 194, DIG. 4; 180/7 R; 244/62, 172

[56] References Cited

U.S. PATENT DOCUMENTS

| | | | |
|---|---|---|---|
| 1,811,465 | 6/1931 | Geloso | 74/194 X |
| 1,953,964 | 4/1934 | Laskowitz | 74/14 |
| 3,006,581 | 10/1961 | Langman | 74/5.37 X |
| 3,199,362 | 8/1965 | Pfeiffer | 74/DIG. 4 |
| 3,203,644 | 8/1965 | Kellogg, Jr. | 180/7.1 X |
| 3,555,915 | 1/1971 | Young, Jr. | 74/84 |
| 3,584,515 | 6/1971 | Matyas | 74/84 |
| 3,653,269 | 4/1972 | Foster | 74/84 |
| 3,807,244 | 4/1974 | Estrade | 74/84 S |
| 3,968,700 | 7/1976 | Cuff | 74/84 S |
| 3,998,107 | 12/1976 | Cuff | 74/84 S |
| 4,095,460 | 6/1978 | Cuff | 74/84 S |
| 4,409,856 | 10/1983 | deWeaver | 74/84 R |

FOREIGN PATENT DOCUMENTS

| | | | |
|---|---|---|---|
| 2825490 | 12/1979 | Fed. Rep. of Germany | 244/62 |
| 1308410 | 9/1962 | France | 74/5.22 |

Primary Examiner—Allan D. Herrmann
Attorney, Agent, or Firm—Biebel, French & Nauman

[57] ABSTRACT

A propulsion system for converting rotary motion into unidirectional motion and consisting of a frame, a pair of counterrotating lower members rotatably mounted to the frame and containing damping elements, a pair of upper members containing damping elements and rotatably mounted to the frame and positioned above the lower members, each at an angle to the lower member so that each contacts a surface of the member below it at a single point, and a motor and drive train for driving the lower members. Each lower member includes a pair of studs mounted at its periphery which engage radially extending posts mounted to its corresponding upper cylinder so that rotation of the lower member causes the upper member to rotate in the same sense and at the same angular velocity. The superposition of the damped upper members upon the damped lower members generates unbalanced centrifugal forces which create a constant unidirectional resultant force.

12 Claims, 7 Drawing Figures

PROPULSION SYSTEM

CROSS-REFERENCE TO RELATED APPLICATION

This application is a continuation-in-part of U.S. application Ser. No. 229,681, filed Jan. 29, 1981 now Pat. No. 4,409,856.

BACKGROUND OF THE INVENTION

1. Field of the Invention

This invention relates to propulsion systems and, in particular, is related to propulsion devices which utilize the centrifugal forces produced by gyrating masses to produce a single resultant unbalanced centrifugal force which acts in one direction.

2. Description of the Prior Art

There are many types of known propulsion devices which convert centrifugal into linear force so that the device does not need a medium against which to push. For example, U.S. Pat. Nos. 4,095,460; 3,998,107; 3,968,700; and 1,953,964 disclose devices in which a plurality of weights are connected to a central hub by a pivoting linkage. The weights are received within an outer circumferential member which spins about a first axis. The hub to which the weights are connected by the pivoting linkage rotates about a second axis which is parallel to but not co-linear with the first axis. As a result, the distance of a selected weight from the center of rotation varies as the weight rotates. This causes a variation in angular momentum and creates a resultant force which is variable and unidirectional. By moving the location of the second axis relative to the first axis, the resultant unidirectional forces can be varied in magnitude and direction to propel a vehicle in which the device is mounted.

A variation of this concept is disclosed in U.S. Pat. Nos. 3,807,244 and 3,584,515. These two patents each disclose a device in which a plurality of masses are rotated about a fixed axis. The masses encounter a constraining member which extends at least partially about the periphery of the axis of rotation and serves to vary the distance the weight extends from the axis of rotation. In this fashion, the distance of a selected weight from the axis of rotation varies as the weight revolves about the axis. This creates a resultant unidirectional force which can be controlled to propel a vehicle within which the device is mounted.

In U.S. Pat. Nos. 3,653,269 and 3,555,915, there is disclosed devices for generating unidirectional thrusts from rotating members which utilizes gyroscopic forces. Each device disclosed consists of spinning members which are mounted on a rotating member so that the axis of the spinning members are normal to the axis of the rotating member. In the former patent, the axes of the spinning members are rotated about a third axis which is normal to the axis of the larger rotating member which carries the spinning members. In both devices, the combination of the gyroscopic forces generated by the spinning members and the centrifugal forces generated by the rotating members coact to generate a unidirectional thrust which does not require a fixed surface against which to push for propulsion.

There are several disadvantages with the above-described prior art devices. For example, these devices typically require a number of complex gearing systems, some of which have to be mounted on rotating members. In addition, some of the prior art devices require a plurality of heavy weights which add to the overall weight of the device and require additional reinforcing members in the supporting frame of the device, resulting in increased expense. Such devices are typically large and bulky and would be difficult to mount safely in a small vehicle. At the same time, their large size makes it difficult for them to be positioned to direct the resultant unidirectional force to guide the vehicle within which they are mounted. Further, these devices generate a resultant force that is cyclic thereby inducing vibratory loads within the device.

Accordingly, there is a need for a device which converts rotational forces to a constant unidirectional force which is relatively compact, does not require a plurality of heavy spinning weights, and does not require complex gearing mechanisms. In addition, there is a need for a device in which the constant unidirectional force which is generated can be directed and controlled easily.

SUMMARY OF THE INVENTION

The present invention encompasses a propulsion system that produces a centrifugal force by superimposing a mass (weight) on a rotating member at a predetermined distance radially from the center of rotation of the member to cause an unbalanced condition on the member resulting in a centrifugal force being generated in the member. To fully understand the physical principles surrounding this system, an examination of the mathematical equations used to calculate this centrifugal force and propulsion force are as follows:

$$F = W(\omega)^2 R/G \qquad (1)$$

$$F_p = F - F' \qquad (2)$$

where,

F = Centrifugal Force
F' = Reaction Force
R = Radius
$F_p$ = Propulsion Force
W = Weight of Out of Balance
$\omega$ = Angular Velocity
G = Acceleration Due to Gravity Examining equation (1), the magnitude of the centrifugal force depends upon the size of the weight that is superimposed on the rotating member, the radius of this weight from the center of rotation and the angular velocity of the rotating member. In accordance with Newton's Third Law of Motion (For every action, there is an equal and opposite reaction), the generation of the centrifugal force caused by the weight being superimposed on the rotating member, a reaction force F', is produced equal in magnitude to the centrifugal force but acts opposite in direction.

Examining equation (2), when F = F', this device will not move. To overcome this difficulty, F−F' must be greater than 0, or F' must be less than F. The invention reduces F' by providing a method of isolating F' the weight that is superimposed on the rotating member. In order to obtain a large propulsive force, the efficiency of the isolation system to reduce F' considerably is the controlling factor.

The present invention provides a propulsion system for converting rotational forces into a constant unidirectional, unbalanced linear force and does not require any reactive engagement with a supporting surface or a fluid medium. The present invention utilizes a single motive source and therefore is less complicated than those prior art devices utilizing a plurality of motors or engines. In addition, the preferred form of the present invention utilizes only two sets of weights, each of which rotates about essentially a single axis. Thus, the present invention does not require a plurality of spinning weights or large spinning disks required of prior devices of this type. In addition, the present invention requires a relatively simple gear train to link the motive source with the two sets of rotating weights and thereby eliminates the need for extensive and complex gearing systems required on many prior art devices.

The propulsion system of the present invention includes at least one force generating unit having upper and lower gyrating masses which interact to create a resultant unidirectional force. The placement of the upper rotating mass upon the lower rotating mass induces an unbalanced condition in the lower rotating mass resulting in a constant centrifugal force in the lower rotating mass at the point of contact of the upper and lower rotating masses. Since both upper and lower masses gyrate in the same direction, unwanted rotational torques may be created which would cause the device to rotate instead of moving in a straight line. These rotational torques can easily be cancelled by creating counterrotational torques through a second set of gyrating masses having an axis of rotation substantially parallel to that of the first set of upper and lower masses.

In one embodiment of the invention, a second force generating unit, rotating in a direction opposite that of the first, is added to the system. This second unit has a mass equivalent to that of the first unit so that equal rotational torques are generated which oppose each other and are thereby cancelled. The two units are arranged so that the resultant forces act in the same direction and therefore are additive.

Thus, the propulsion system of the present invention includes a frame, a pair of lower members mounted to the frame to rotate about first and second axes, a pair of upper members, each positioned above a lower members and mounted to the frame to rotate about third and fourth axes skewed to the first and second axes, a single motor for rotating lower members in opposite directions about their respective first and second axes through a bifurcated drive train, and complementary connecting linkage carried by the lower members and upper members so that the lower members may engage and drive the upper members. The lower members each include a flat camming surface which faces upward and the lower portion of the upper members each includes a bottom rim, a portion of which rests upon the camming surface.

The upper members are rotatably mounted on upper shafts which are themselves rotatably mounted to the frame. The central axes of the lower portions of the upper shafts comprise the third and fourth axes about which the upper members rotate. The lower members are each mounted on a lower shaft which in turn is rotatably mounted to the frame. The axes of rotation of the lower shafts comprise the first and second axes about which the lower members rotate.

The third and fourth axes are skewed with respect to the first and second axes so that the upper members are tilted with respect to the lower members. The bottom rims of the upper members contact the lower members above which they are mounted at a single point. As the upper members and lower members are rotated during operation of the propulsion apparatus, this point of contact does not change relative to the third and fourth axes of the upper shafts. Preferably, the third and fourth axes are skewed with respect to the first and second axes at an angle of about 3°.

The upper members are preferably made of aluminum or other metal and are cylindrical in shape. However, each includes a non-metallic damping element which isolates a segment of the upper member having the bottom rim from the remainder of the member so that there is no metal-to-metal contact therebetween. The internal damping of these members created by the inclusion of these damping elements is necessary for the creation of the unidirectional force.

Similarly, the lower members, preferably made of aluminum and disk-shaped, are isolated from the drive train by a non-metallic damping element so that there is no metal-to-metal contact. This isolation of the lower member is also necessary for the creation of the unidirectional force.

The propulsion system preferably is powered by a single electric motor, which is centrally mounted in a lower portion of the frame, although any type of prime mover can be used that produces rotary motion. The motor drives a three-way gear unit which has two output shafts rotating in opposite senses to one another. The two output shafts of the three-way gear unit each power a separate right angle gear unit which ultimately rotates the lower shafts.

The connecting linkage mounted on the lower members consists of at least one pair of studs mounted in the camming surface and extending upwardly on opposite sides of the upper member. Each pair of studs mounted on the lower member must be on a common diameter. The connecting linkage of the upper member includes a corresponding pair of posts which extends outwardly from its periphery and are positioned to engage the studs mounted in the lower members. Each pair of posts must also lie on a common diameter. When the lower disks are rotated by the motor, each pair of studs engages its complementary pair of posts so that the lower members cause the upper cylinders to rotate at the same angular velocity.

The upper shafts which carry the upper members are journaled into cylindrical bearings which are rotatably mounted within the frame. The upper shafts slidably engage the cylindrical bearings and can be adjusted relative to the bearings by means of a bolt and lock-nut combination. By adjusting the position of the upper shafts relative to the bearings, the positions of the upper members can be adjusted in a horizontal plane relative to the lower members. The purpose of this adjustment is to locate the top member horizontally so that the points of contact for the rotating members will be radially equal, measured from the centers of their respective shafts. If this is accomplished, then the points of contact between the top and bottom members remain fixed relative to the frame during each complete revolution of the members.

Each of the bearings which carry the upper shafts includes a portion extending above the frame which carries a sprocket wheel. The sprocket wheels are joined to each other and to a master wheel by means of a timing belt. The master wheel in turn may be controlled by a steering wheel or other manually operable device to cause the sprocket wheels and thus the bearings to rotate relative to the frame. Points of contact between each of the pairs of upper and lower members must be maintained in the same angular position.

In one embodiment, the upper members each comprise a top cylinder member, a bottom cylinder member which terminates in the bottom rim, and a non-metallic cylinder couple which is carried by the top cylinder member and in turn retains the bottom cylinder member. The non-metallic cylinder couple functions as a damping and reactive force isolating element for the upper cylinders and includes a nylon annulus which is press-fitted over the top cylinder member. The bottom cylinder member includes a recess which retains a non-metallic bolt which is threaded into the nylon annulus. The space between the nylon annulus and the bottom cylinder member is filled with a plurality of non-metallic rings, preferably made of cork, felt, or rubber to eliminate metal-to-metal contact between the top cylinder member and the bottom cylinder member.

Similarly, each lower member includes a lower disk and a non-metallic coupling disk mounted to the lower disk, preferably made of a phenolic resin. The coupling disk is in turn mounted to a mounting disk which is driven by the drive train. Thus, the lower disks are isolated from the drive train by a damping element that eliminates metal-to-metal contact.

The camming surface of the lower disks preferably includes a circular pad made of rubber and of a sufficient size so that the point of contact of the bottom rim of the bottom cylinder member on the camming surface always engages a portion of the rubber pad as the upper member and lower member rotate.

In order to provide a secure engagement of the upper member against the lower member, a biasing device such as a coil spring is placed over the upper shafts between the frame and the top cylinder member to push or force the upper member downwardly against the lower member and prevent the upper member from vibrating away from the lower member along the upper shaft.

From experiments conducted on this device, it is believed that at the point of contact the upper member superimposes its weight on the lower member thereby creating an unbalanced condition in the lower member which results in the centrifugal force F being induced into the lower member. The lower member induces a centripetal force or reactive force F' into the upper member. The upper damping element prevents the forces F and F' from canceling each other by isolating F' and thereby preventing F' from entering the framework through the upper shafts located on the third and fourth axes. The more F' can be isolated from the top shafts, the larger the propulsion force. The net constant propulsive force would equal F −F'.

It is essential that the engaging linkage be designed so that the upper members and lower members are rotating at the same angular velocity. The radius at the point of contact must also be equal for the lower members and the upper members.

The direction of the resultant unidirectional force can be varied by rotating the master wheel which in turn rotates the sprocket wheels by means of the timing belt which interconnects the wheels. By rotating the sprocket wheel, the bearings containing the upper shafts are rotated thereby rotating the upper shafts and changing the position of the point of contact relative to the frame. Since the resultant unidirectional force is always in a direction extending from the point of contact to the axis of rotation of each upper shaft, the rotational movement of the point of contact about that axis changes the direction of the resultant unidirectional force.

If both upper members and upper shafts are oriented so that their respective points of contact coincide, the resultant unidirectional forces are in the same direction and have an additive effect which results in an even larger unidirectional force in the given direction. Thus, the present invention provides a system which generates a unidirectional force from rotational forces independently of the external environment.

In an alternate embodiment of the invention, a magnetic coupling is employed between the upper and lower rotating members of the apparatus. The lower rotating members each include a plurality of permanent magnets arranged in a ring which is parallel to the upper surface of the lower member. The magnets are substantially cube-shaped, and are arranged so that their poles alternate orientation about the ring; that is, a magnet having its south pole oriented upwardly will be positioned between two magnets whose south poles are oriented downwardly.

The ring of permanent magnets is mounted upon a disk made from a ferromagnetic material and is located adjacent an inner rim which is also made of a ferromagnetic material. The ring of magnets is held against the inner rim by an outer rim of a nonmagnetic material such as aluminum or stainless steel. The disk and inner rim are isolated from the remainder of the lower member by a pad made of a phenolic resin or other nonmagnetic material to prevent the bearings supporting the lower member in the frame from becoming magnetized.

The upper member includes a lower ring made of a ferromagnetic material and having a plurality of radially extending slots formed therein. The slots increase the ability of the lower ring to acquire high magnetization in the magnetic field of the permanent magnets located in the lower rotating member.

The lower ring is attached to an outer rotating element which is separated from an inner rotating element by a set of outer bearings. The inner rotating element in turn is separated from the upper shaft by a second set of inner bearings. Thus, the outer rotating element may rotate relative to the inner rotating element and the inner rotating element may rotate with respect to the upper shaft.

Rotation of the lower rotating member during operation of the apparatus induces rotation of the outer element of the upper rotating member. Experiments have shown that this in turn causes a rotation in a similar direction of the inner rotating element of the upper member. As in the previously described embodiment, the interaction of the upper and lower members, created by the weight of the upper member being superimposed on the lower member, creates a resultant force which extends in a direction from the point of contact through the axis of rotation of the upper member about the upper shaft. It is believed that the inner rotating element performs a reactive force isolating and damping function by rotating and thereby absorbing a portion of the reactive force.

Accordingly, it is an object of the present invention to provide a propulsion system which requires only a single power source to operate the system; a propulsion system which requires only two sets of rotating members which rotate about essentially two axes; and to provide a propulsion system which includes a relatively simple power train and relatively uncomplicated gearing mechanisms to reduce the overall complexity and expense of the system.

Other objects and advantages of the invention will be apparent from the following description, the accompanying drawings and the appended claims.

DETAILED DESCRIPTION OF THE PREFERRED EMBODIMENT

Figure 1:
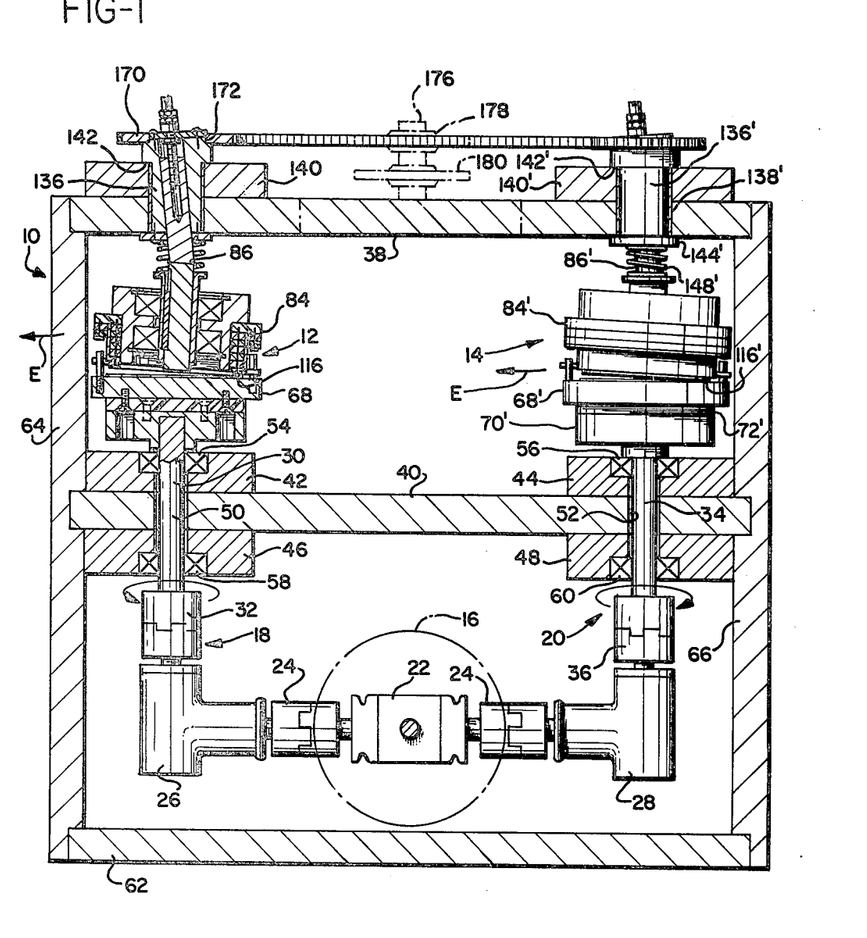
FIG. 1 is a side elevation of the invention in which the frame and the left force generating unit are shown in section.

The propulsion system of the present invention is best shown in FIG. 1 and consists of an aluminum frame 10, left and right force generating units 12, 14, a source of motive power such as a conventional electric motor 16 (shown schematically), and left and right drive trains 18, 20. The motor 16 is of conventional design and is linked to the drive trains 18, 20 by means of a standard three-way gear drive 22. The three-way gear drive 22 drives flexible couplings 24 which in turn drive left and right right angle gear drives 26, 28.

The left right angle gear drive 26 drives a first lower shaft 30 through a flexible coupling 32 and the right right angle gear drive 28 drives a second lower shaft 34 through a flexible coupling 36. As shown in FIG. 1, the first lower shaft 30 drives the left force generating unit 12 and the second lower shaft 34 drives the right force generating unit 14. The left and right right angle gear drives 26, 28 are each geared so that the left and right force generating units 12, 14 rotate in directions opposite to each other.

The left and right force generating units 12, 14 are each journaled at an upper portion into the frame 10 at an upper plate 38. The frame 10 also includes a median plate 40 to which upper blocks 42, 44 and lower blocks 46, 48 are mounted, preferably by welding. The median plate 40, upper blocks 42, 44, and lower blocks 46, 48 define passageways 50, 52 through which passes the first lower shaft 30 and second lower shaft 34, respectively.

The upper blocks 42, 44 contain upper bearings 54, 56 and the lower blocks 46, 48 contain lower bearings 58, 60. Upper bearings 54 and lower bearings 58 engage the first lower shaft so that the shaft does not contact the surface defining the passageway 50 through the median plate 40 and upper and lower blocks 42, 46. Similarly, upper bearings 56 and lower bearings 60 engage the second lower shaft 34 so that it does not contact the surface defining the passageway 52 which passes through the median plate 40, upper block 44 and lower block 48.

The frame 10 also includes a base plate 62 which supports the electric motor 16 by means of a mounting plate (not shown) of conventional design. The base plate 62 preferably includes mounting means (not shown) which would be used to mount the propulsion system of the present invention to a selected apparatus. The base plate 62, median plate 40, and upper plate 38 are joined by left and right side walls 64, 66.

The left and right force generating units 12, 14 contain identical components arranged in an identical fashion. Therefore, only the left force generating unit 12, which is shown in FIG. 2, will be described with the understanding that the description applies as well to the right force generating unit 14.

Figure 2:
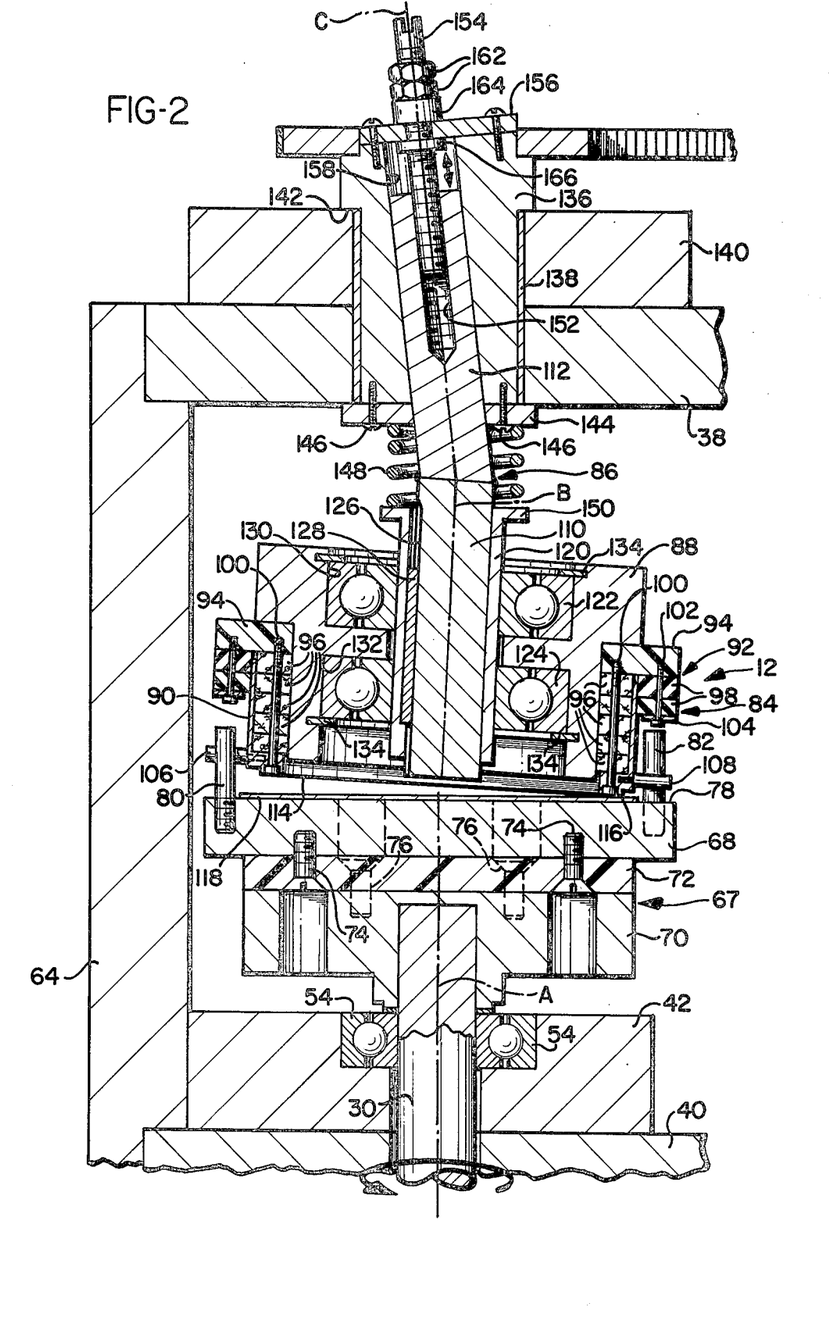
FIG. 2 is an enlarged side elevation in section of the left force generating unit of FIG. 1.

As best shown in FIG. 2, the force generating unit 12 includes a lower rotating member 67 which includes disk 68 and mounting disk 70 that is press-fitted onto an end of the first lower shaft 30. The disk 68 is separated from the mounting disk 70 by a coupling disk 72. The disk 68 is joined to the coupling disk 72 by means of upwardly extending bolts 74 which do not contact the mounting disk 70. The mounting disk 70 is attached to the coupling disk 72 by means of downwardly extending bolts 76, shown in phantom, which do not contact disk 68. Thus, the coupling disk 72, which is made of a non-metallic material such as a phenolic resin, separates disk 68 from the mounting disk 70, preferably made of aluminum, and eliminates metal-to-metal contact between the two members.

Disk 68 includes a camming surface 78 in which is threaded a pair of studs 80, 82. Preferably, the studs 80, 82 are positioned along a common diameter and are equidistant from a first axis of rotation designated by line A.

The force generating unit 12 also includes an upper member 84 which is rotatably mounted on a first upper shaft 86. The upper member 84 consists of a top cylinder member 88, a bottom cylinder member 90, and an isolating coupling 92. The isolating couple 92 is comprised of a plurality of non-metallic elements and includes a nylon annulus 94, which is press-fitted onto the top cylinder member 88, and a plurality of rings 96 made from an insulating material such as cork, felt, or rubber. In addition, the bottom cylinder member 90 is held to the insulating rings 96 by a pair of rubber rings 98 which extend about the outer periphery of the upper portion of the bottom cylinder member.

The bottom cylinder member 90 is attached to the nylon annulus 94 by means of a nylon bolt 100 which extends through the insulating rings 96 to be threaded into the nylon annulus. The rubber rings 98 are secured to the nylon annulus 94 by bolts 102 which are threaded into the nylon annulus. A hardened retaining ring 104 is positioned beneath the rubber rings 98 so that it is engaged by the bolts 102 and acts with the bolts to clamp the rubber rings against the nylon annulus.

The bottom cylinder member 90 includes a pair of posts 106, 108 which extend outwardly from the bottom cylinder member along a radius. Preferably, the posts 106, 108 lie along a common diameter. The posts are positioned to be engaged by the studs 80, 82 so that rotation of the lower disk 68 causes a rotation of the upper cylinder 84 in the same direction and at the same angular velocity.

The upper member 84 is rotatably mounted to a lower rod portion 110 of the first upper shaft 86. The upper portion of the first upper shaft 86 comprises a bar portion 112 which has a square cross section (See FIG. 4). The first upper shaft 86 is mounted to the upper plate 38 of the frame 10 so that the lower rod portion 110 defines a central axis denoted by line B which is skewed to line A which is defined by the central axis of the first lower shaft 30. As a result, the upper member 84 is oriented at an angle to the lower disk 68 and the bottom rim 114 of the bottom cylinder member 90 contacts the camming surface 78 at a single point of contact 116. Preferably, the camming surface 78 includes a disk-shaped rubber pad 118 which is sized so that the point of contact 116 is at all times cushioned by the rubber pad.

It is preferable to skew the axis B of the lower rod portion 110 such that it makes an angle of 3° with the axis A of the lower shaft 30. It is also desirable to skew the central axis C of the bar portion 112 of the upper shaft 86 such that it makes an angle of 6° with axis A. Thus, the upper member 84 remains in a substantially fixed position above the lower member 67 as the upper shaft 86 is rotated with respect to the upper plate 38.

The lower rod portion 110 of the first upper shaft 86 is slidably engaged within a bushing 120 which in turn is press-fitted within upper and lower cylinder bearings 122 and, 124 respectively. The lower rod portion 110 includes a key slot 126 which receives a key 128 which is used to position the lower rod portion relative to the bushing 120. The upper and lower cylinder bearings 122, 124 are retained within upper and lower recesses 130, 132 respectively within the top cylinder member 88 by means of snap rings 134. In this fashion, the top cylinder member 88 and hence the isolating coupling 92 and bottom cylinder member 90, may freely rotate about the lower rod portion.

As shown in FIGS. 1 and 2, the bar portion 112 of the first upper shaft 86 slidably engages a cylindrical bearing 136. The cylindrical bearing 136 is rotatably mounted in the upper plate 38 and is enclosed by a bushing 138. The upper plate 38 is reinforced at this location by a mounting block 140 which is superimposed upon the upper plate and encloses the cylindrical bearing 136 and bushing 138. The cylindrical bearing 136 is retained within the upper plate 38 and mounting block 140 by an annular shoulder 142 which rests upon the upper surface of the mounting block, and a retaining plate 144 which abuts the lower surface of the upper plate.

The retaining plate 144 is mounted to the bottom surface of the cylindrical bearing 136 by means of a pair of screws 146. The retaining plate 144 also serves as a seat for an extension spring 148 which is positioned between the retaining plate and an upper flange 150 of the bushing 120. Thus, the coiled extension spring 148 urges the bushing 120 and hence the upper cylinder 84 against the rubber pad 118 mounted on the mounting surface 78.

The bar portion 112 includes a threaded recess 152 which receives a slot-headed bolt 154. The slot-headed bolt 154 passes through a covering cap 156 which encloses a square passageway 158 sized to receive the bar portion 112. The covering cap 156 is secured to the top surface of the cylindrical bearing 136 by mounting screws 160. The bolt 154 is adjustably secured to the covering cap 156 by a pair of locknuts 162 which rest upon a washer 164 above the cap, and a flange 166 which is positioned below the cap within the passageway 158. In this fashion, the bar portion 112 of the first upper shaft 86 can be positioned linearly within the passageway 158 by turning the slot-headed bolt 154 so that it threads into or out of the threaded recess 152, then locking the threaded bolt to the covering cap 156 by means of locknut 162 and flange 166.

Similarly, the right force generating unit 14, shown in FIG. 1, includes a lower member 67' having a disk 68', mounting disk 70', and coupling disk 72' which are mounted to and driven by the second lower shaft 34. The right force generating unit 14 also includes an upper member 84' which is suspended from the upper plate 38 by means of a second upper shaft 86'. The construction of these elements are identical to the corresponding elements described above in the left force generating unit 12 and the point of contact 116' of the right upper member 84' is oriented with respect to the second upper shaft 86' in the same fashion as the point of contact 116 is oriented with respect to the first upper shaft 86 in the left force generating unit 12.

The means for suspending the upper member 84' also corresponds to that for the upper member 84 of the left force generating unit 12. Like its counterpart, the upper member 84' includes a second upper shaft 86' which slidably engages a cylindrical bearing 136' which is fitted into a bushing 138' that in turn is rotatably mounted in the upper plate 38 and a mounting block 140'. The cylindrical bushing 136' rests upon the mounting block 140' by means of an annular shoulder 142' and is clamped to the upper plate 38 by a retaining plate 144' attached to the lower part of the cylindrical bearing by means of bolts (not shown). The right force generating unit 14 also includes a coil spring 148' which pushes the upper member 84' downwardly onto the lower disk 68'.

Figure 3:
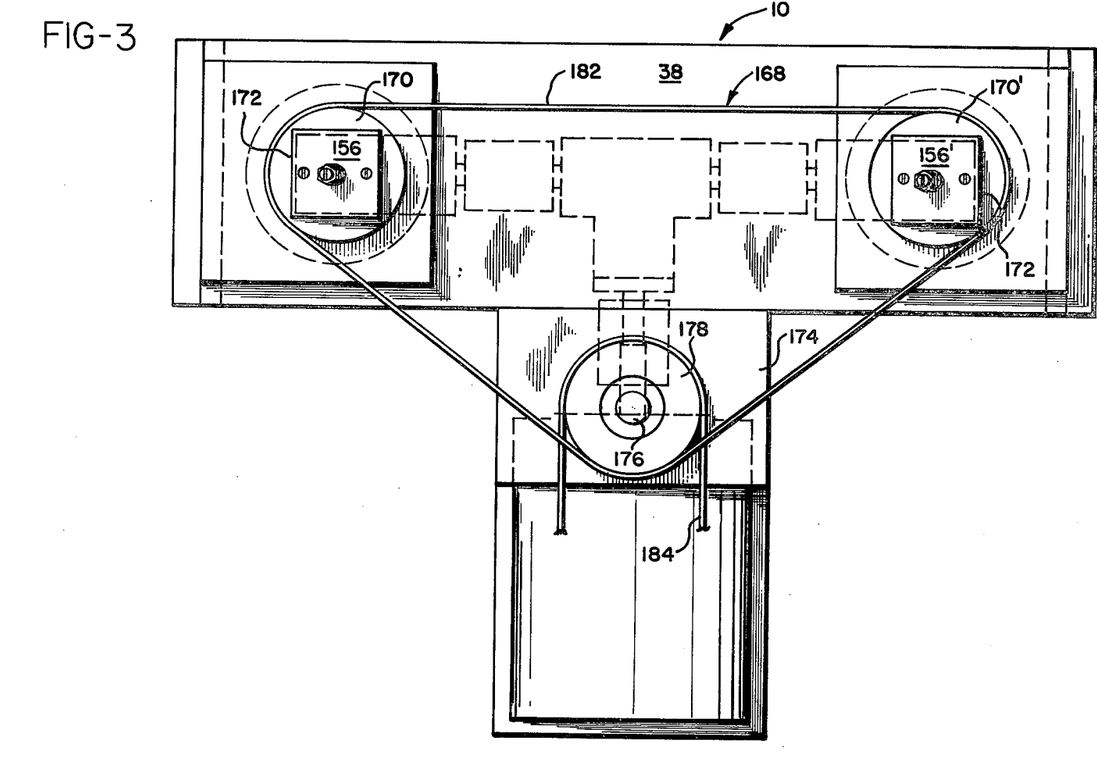
FIG. 3 is a plan view of the invention of FIG. 1 showing the position of the motor and the steering mechanism.

As best shown in FIGS. 1 and 3, the propulsion system of the present invention includes a steering mechanism, generally designated 168. The left cylindrical bearing 136 includes a sprocket wheel 170 which is press-fitted onto a neck portion 172. Similarly, the right cylindrical bearing 136' includes a right sprocket wheel 170' which is press-fitted onto a neck portion 172'. The upper plate 38 includes a platform 174 on which is rotatably mounted an axle 176. The axle 176 is journaled into the platform 174 by bearings (not shown) of conventional design. The axle 176 includes an upper sprocket wheel 178 and lower sprocket wheel 180 which are securely mounted to the axle 176 to prevent rotation relative to each other.

The sprocket wheels 170, 170', and 178 are joined by a timing belt 182 having ribs on its inner surface which engage the sprockets of the sprocket wheels. In this fashion, the upper sprocket wheel 178 acts as a master wheel which can be turned to cause the sprocket wheels 170, 170' to rotate with it in unison. The lower sprocket wheel 180 (see FIG. 1) is driven by a steering belt 184 which can be connected to means (not shown) for rotating the upper and lower sprocket wheels about the axle 176. The means can consist of any conventional steering means such as a hydraulic or pneumatic device, a manually operated wheel, or an electrical device such as a servomotor, stepping motor, or electric solenoid.

As best shown in FIG. 1, the rotation of the upper and lower sprocket wheels 178, 180 causes the sprocket wheels 170, 170' to rotate in the same direction thereby rotating their respective first and second upper shafts 86, 86'. This causes their respective points of contact 116, 116' to change position relative to the frame 10.

Figure 4:
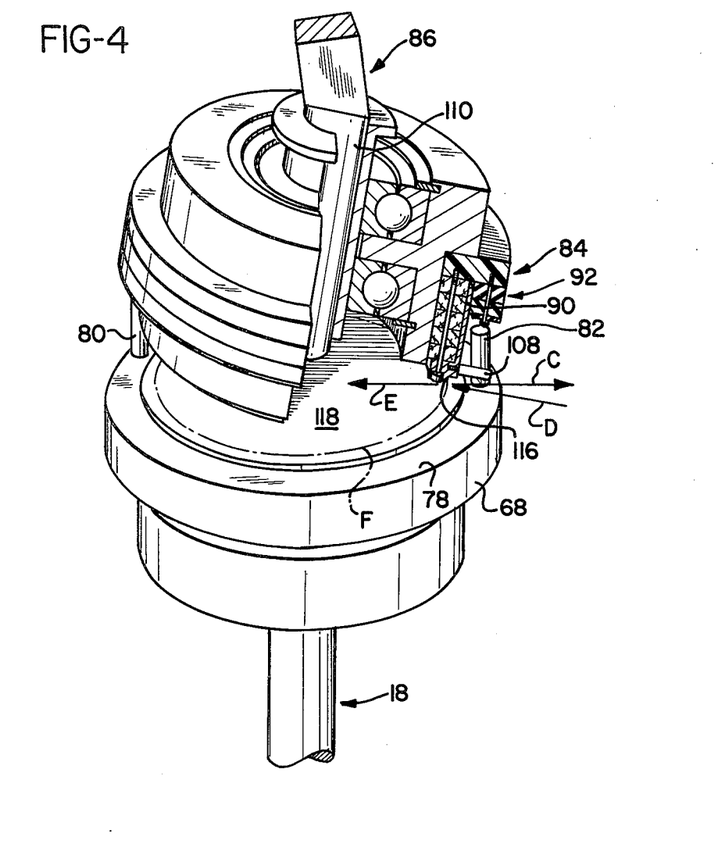
FIG. 4 is a perspective view of the left force generating unit of FIG. 2 in which the upper cylinder is in half section.

The operation of the propulsion system of the present invention is shown in FIG. 4. As the lower member 67 of the left force generating unit 12 is rotated by the left driven train 18, the engagement of the studs 80 and 82 with the posts 106, 108 causes the upper member 84 to rotate about the lower rod portion 110 of the first upper shaft 86. The rotation of the lower disk 68 generates a centrifugal force represented by the vector arrow C. The superposition of the upper member 84 upon the camming surface 78 at the point of contact 116 causes an unbalanced condition upon the lower disk 68 which generates a reactive force represented by the vector arrow D which is normal to the surface of the bottom cylinder member 90.

As a result of the damping qualities inherent in the isolating couple 92 and coupling disk 72 the forces are not equal and a resultant force, represented by the vector line E results which is a unidirectional linear force. The vector arrow E extends from the point of contact 116 through a diameter of the lower disk 68. The rubber pad 118 is placed beneath the bottom cylinder member 90 to reduce noise generated by the engagement of the bottom cylinder member 90 and the lower disk 68. The point of contact 116, which remains fixed relative to the lower rod portion 110, describes a circular path on the pad 118 which is denoted by circle F in FIG. 4.

The magnitude of the resultant force, vector arrow E, can be varied by varying the output of the motor 16. The magnitude of this force is directly proportional to the rotational speed of the motor 16.

The direction of the resultant force is varied by rotating wheel 178 which in turn rotates upper shafts 86, 86' to change the location of the points of contact 116, 116' relative to the frame 10. The resultant forces, which always intersect the points 116, 116' and the central axes B, B', will likewise be rotated.

It is necessary to orient the left and right force generating units 12, 14 so that their respective first and second upper shafts 86, 86' cause the points of contact 116, 116' to create resultant forces which act in the same direction so that their effect is additive. In addition, it is necessary to provide the gearing in the left and right drive trains 18, 20 so that the lower disks 68, 68' rotate in directions opposite to each other thereby eliminating any existing rotational torques that may be generated during operation. Furfhermore, in order to effectively superimpose the weight of the upper member 84 upon the lower rotating member 67, the upper member must be aligned with it so that the distance from the center line of shaft 110 to the point of contact 116 is equal to the distance from the center line of shaft 30 to the point of contact.

Figures 5, 6:
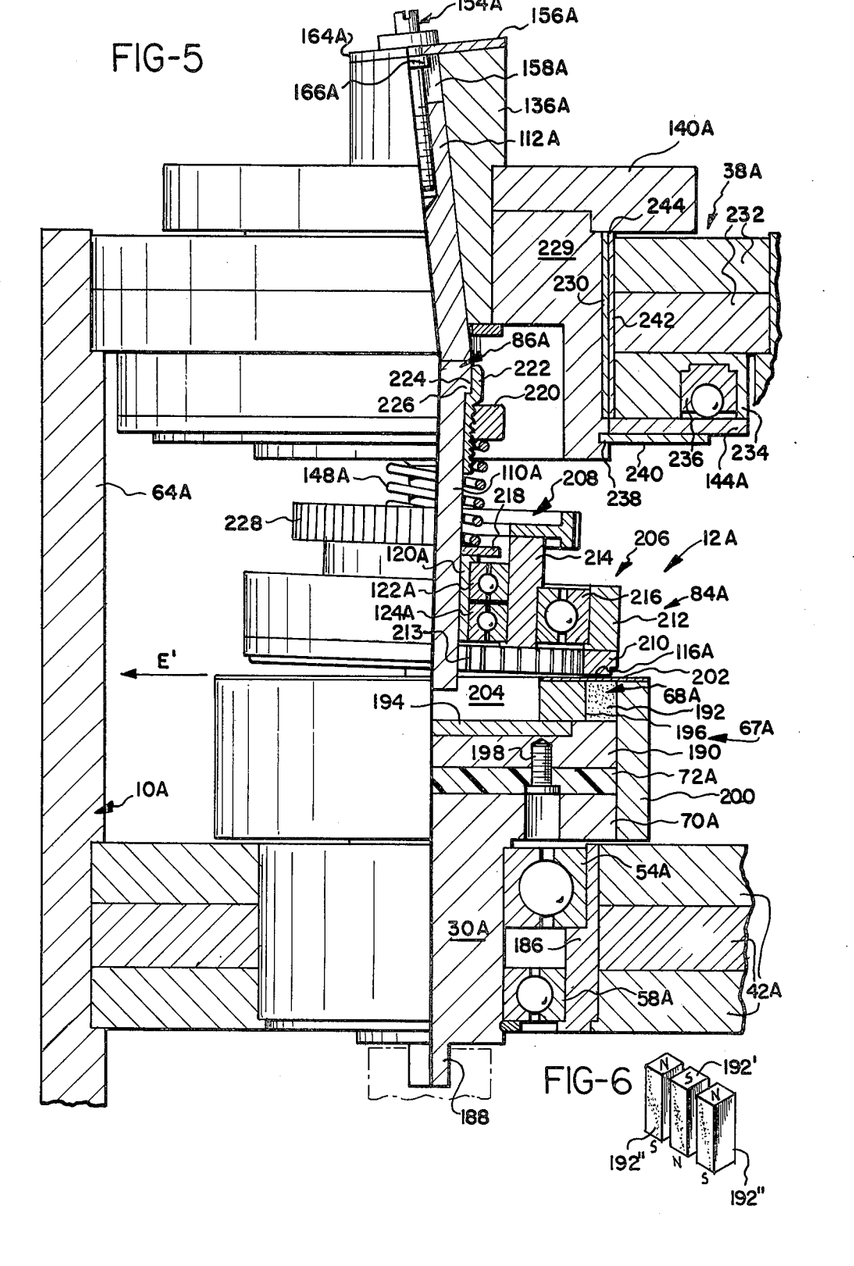
FIG. 5 is a side elevation of an alternate embodiment of the invention, showing a left force generating unit in half section.
FIG. 6 is a perspective view of three of the permanent magnets utilized in the alternate embodiment of FIG. 5.
Figure 7:
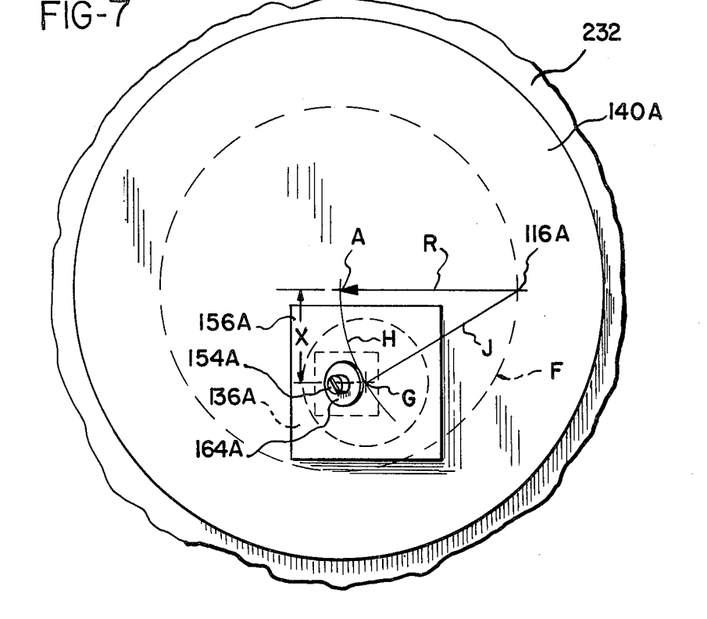
FIG. 7 is a plan view of the thrust block assembly of the alternate embodiment of FIG. 5.

FIGS. 5, 6, and 7 show an alternate embodiment of the invention. Those elements performing a similar function and/or having a design similar to corresponding elements of the embodiments shown in FIGS. 1-4 are given the same reference numbers as the corresponding elements, followed by the letter "A". The alternate embodiment includes a force generating unit 12A having an upper rotating member 84A and a lower rotating member 67A. The lower member 67A includes a mounting disk 70A having a portion defining a lower shaft 30A. The mounting disk 70A is supported by upper and lower bearings 54A, 58A which in turn are mounted in a lower bushing 186. Lower bushing 186 is press-fitted into upper blocks 42A which are mounted to the frame lOA.

The mounting disk 70A includes a lug 188 which is sized to engage a coupling (not shown) driven by the motor. The mounting disk 70A supports a coupling disk 72A, made of a nonmagnetic material such as a phenolic resin. The coupling disk 72A in turn supports a cup-shaped disk 190. The cup-shaped disk 190 receives a lower disk 68A which comprises a plurality of permanent magnets 192 arranged in a ring about the periphery of the cup-shaped disk. The lower disk 68A also includes an inner disk 194 which is supported by the cup-shaped disk and includes an outer peripheral wall 196 which abuts the magnets 192.

The coupling disk 72A is joined to the cup-shaped disk 190 by screws 198, which extend upwardly through the coupling disk. Similarly, the coupling disk 72A is joined to the mounting disk 70A by screws (not shown) which extend downwardly through the coupling disk to the mounting disk so that there is no direct metallic joint between the cup-shaped disk to the mounting disk, an arrangement similar to that shown and described for the mounting disk 70 and coupling disk 72 in FIG. 2.

The magnets 192 are arranged about the periphery of the inner disk 194 such that their poles alternate orientation, as shown in FIG. 6. Thus, a magnet 192' having its south pole facing upwardly will be positioned between magnets 192" having south poles oriented downwardly in an opposite direction. The magnets preferably are permanent magnets, such as Alnico magnets manufactured by The Arnold Engineering Co., Marengo, Ill.

The lower member 67A also includes an outer annular ring 200 which encloses the mounting disk 70A, coupling disk 72A, cup-shaped disk 190, and lower disk 78A. The outer annular ring 200 is preferably formed of a nonmagnetic material such as aluminum or stainless steel so that it will not become magnetized by the magnets 192. The inner disk 194 preferably is made of a ferromagnetic alloy such as steel, as is the cup-shaped disk 190. The mounting disk 70A preferably is made of steel but is isolated from the magnets 192 so it is not greatly affected by the magnetic field they generate.

The upper surface of the lower member 67A is covered by a washer 202 which is preferably made of a nonmagnetic material such as stainless steel. The washer 202 defines an opening in its center and, together with the inner disk 194, defines a recess 204 in the lower member 67A.

The upper member 84A includes an outer rotating element 206 and an inner rotating element 208. The outer rotating element 206 includes a ring 210 which is attached to an annular member 212. The ring 210 preferably is made of a ferromagnetic material such as steel and includes a plurality of radially extending slots 213 formed about its inner periphery and preferably evenly spaced. The annular member 212 is preferably made of a nonmagnetic material such as aluminum or stainless steel.

The inner rotating element 208 operates to isolate or dampen the reactive forces generated during operation of the apparatus and includes a bushing 214, preferably made of steel. The bushing 214 is joined to the outer rotating element 206 by outer bearings 216. The bushing 214 is joined to an inner bushing 120A by inner bearings 122A, 124A.

Inner bushing 120A slidably engages a cylindrical lower rod portion 110A which forms a part of an upper shaft 86A which may extend downwardly into the recess 204. The inner bushing 214 supports a washer 218 that forms a lower stop for a coil spring 148A. An upper stop for the coil spring 148A is provided by a lock nut 220 which is threaded onto a bolt 222 carried on the lower rod portion 110A of the upper shaft 86A. The threaded bolt includes a countersink 224 which engages an annular flange 226 formed on the lower rod portion 110A so that it may not be forced upwardly by the spring 148A. The inner rotating member 208 may also include a pinion 228, mounted to the bushing 214, to provide a means for driving other machinery such as a generator to expend energy absorbed by the bushing 214 and bearing 216 dring operation. The pinion preferably would drive a timing belt or chain (not shown).

The upper shaft 86A includes a bar portion 112A, having a rectangular or square shape in cross section, slidably mounted within a passageway 158A defined in a cylindrical bearing 136A and having a similar shape in cross section. The bar portion 112A is retained within the cylindrical bearing 136A by a slot-headed bolt 154A which threads into the bar portion and includes a flange 164A that rests upon a covering cap 156A. A complementary locking nut 166A is positioned below the covering cap 156A to fix the bolt 154A with respect to the covering cap and cylindrical 136A.

The cylindrical bearing 136 is press-fitted into a disk-shaped mounting block 140A. The mounting block 140A and cylindrical bearing 136A are both press-fitted onto a support member 229 which includes an annular bushing 230 about its periphery. The support member is rotatably mounted within the upper plate 38A of the frame 10A. Upper plate 38A includes a pair of fixed, disk-shaped plates 232 which are also supported by the side wall 64A of the frame 10 Mounted beneath the plates 232 is a bearing plate 234 which supports a plurality of roller bearings 236, spaced evenly abouts its periphery.

The support member 229 defines a circumferential notch 238 which receives a ring 240. The ring supports a retaining plate 144A which is press-fitted to the outer periphery of the support member 229 and is therefore fixed relative to the support member. The disk-shaped plates 232 and bearing plate 234 surround a mating annular bushing 242 which slidably engages the bushing 230. Thus, as the cylindrical bearing 136A is rotated, the mounting block 140A, support member 229, and retaining plate 144A rotate relative to the disk-shaped plates 232 and bearing plate 234. The annular bushing 230 rotates relative to the mating annular bushing 242 and the retaining plate 144A engages the roller bearings 236. In addition, the underside of the mounting block 140A slidably engages the mating annular bushing 242 at the upper surface 244 of the bushing.

As shown in FIG. 7, the cylindrical bearing 136A, and hence the upper shaft 86A, is preferably mounted eccentrically or away from the center of the circular mounting block which is collinear with the axis of rotation A of the lower rotating member 67A. The position of the cylindrical bearing 136A is determined by placing the central axis G of the cylindrical bearing on an arc H having a radius R of curvature extending from the point of contact 116A and having a length such that it extends to the axis of rotation A of the lower member 67A. In addition, the cylindrical bearing 136A is preferably rotated such that the bar portion 112A of the upper shaft 86A is inclined downwardly toward the point of contact 116A, along radius line J. The cylindrical bearing 136A thus will have an eccentricity X which is measured along a line normal to a line containing the point of contact 116A and axis A, as shown in FIG. 7. This eccentricity has been found to have a direct relationship with the degree that the reactive force F' is reduced or dampened by the bushing 214 and outer bearings 216, which absorb this reactive force. Thus, the greater the eccentricity, the greater the amount of reactive force F' is absorbed and isolated.

The embodiment depicted in FIG. 5, 6, and 7 is similar in all other respects to the embodiment previously discussed and shown in FIGS. 1 through 4. Accordingly, the lower rod portion 110A is tilted to skewed with respect to a central axis of rotation of the lower member 67A an angle of approximately 3°. The interaction of the upper member 84A and lower member 67A at the point of contact 116A also creates a net resultant force E' which extends from the point of contact through the central axis of rotation of the lower member 67A. The force generating unit 12A preferably is one of two force generating units mounted within a frame 10A and caused to rotate in opposite directions by a motor (not shown). This arrangement is preferably substantially similar to that shown in FIG. 1 for the previously discussed embodiment.

In operation, the rotation of the lower member 67A causes the upper member 84A to rotate as a result of the magnetic coupling which exists between the magnets 192 and the ring 210. The slots formed in the ring 210 increase the ability of the ring to acquire high magnetization in the magnetic field created by the magnets 192, and thus be rotated by them. The bushing 214 and outer bearings 216 in combination act to absorb the reactive force generated by the superposition of the upper and lower members 84A, 67A and thereby isolate or dampen it when they rotate. Although the exact mechanism is not known, experiments have demonstrated that the rotational energy transmitted from lower member 67A to ring 210 and annular member 12 is conveyed through outer bearings 216 to bushing 214 and pinion 228. The rotational motion of pinion 228 can be used to drive other machinery.

There are many advantages of the propulsion system of the present invention. For example, the left and right force generating units are relatively small and the top cylinder members, bottom cylinder members, lower disks, and mounting disks may be made of metal such as aluminum which provides a concentrated mass for generating a resultant force in a relatively small area, thereby eliminating the need for large spinning disks or rotating weights at the ends of rods. The resultant forces generated by the force generating units does not vary during the time of operation; the force is constant and can provide smooth propulsion for any vehicle powered by this device. In addition, the gearing required for the force generating units to be powered by the electric motor is simple in construction and requires only conventional types of gear drives and connections. There is no need for exotic gear arrangements or complex gearing.

While the form of apparatus herein described constitutes a preferred embodiment of this invention, it is to be understood that the invention is not limited to this precise form of apparatus, and that changes may be made therein without departing from the scope of the invention.

What is claimed is:

1. An apparatus for converting rotary motion into linear motion comprising:
    a frame;
    at least one lower member having a camming surface and mounted to said frame to rotate about a first axis;

said lower member including lower nonmetallic damping means isolating said camming surface from the remainder of said lower member;

at least one upper member positioned above said lower member and mounted to said frame to rotate about a second axis skewed to said first axis;

said upper member including a bottom rim, a portion of which engages said camming surface of said lower member at a point thereon;

said upper member including upper damping means isolating said bottom rim from a remainder of said upper member;

means for rotating said lower member about said first axis; and means carried by said lower member for driving said upper member such that rotation of said lower member by said rotating means causes said upper member to rotate about said second axis in the same direction as said lower member, thereby creating unbalanced centrifugal forces which result in a first linear force substantially normal to said first axis.

2. The apparatus of claim 1 wherein said driving means rotates said upper member at the same angular velocity as said lower member.

3. The apparatus of claim 1 wherein said portion of said bottom rim is at a radial distance from said second axis that is equal to the radial distance from said first axis to said point on said lower member.

4. An apparatus for converting rotary motion into linear motion comprising:

a frame;

at least one lower member having a camming surface and mounted to said frame to rotate about a first axis;

said lower member including lower non-metallic damping means isolating said camming surface from the remainder of said lower member;

at least one upper member positioned above said lower member and mounted to said frame to rotate about a second axis skewed to said first axis;

said upper member including a bottom rim, a portion of which engages said camming surface of said lower member at a point thereon, said portion being at a radial distance from said second axis substantially equal to a radial distance from said first axis to said point;

said upper member including upper damping means isolating said bottom rim from a remainder of said upper member;

means for rotating said lower member about said first axis; and means carried by said lower member for driving said upper member such that rotation of said lower member by said rotating means causes said upper member to rotate about said second axis in the same direction as and at substantially the same angular velocity as said lower member, thereby creating unbalanced centrifugal forces which result in a first linear force substantially normal to said first axis;

said driving means including magnet means mounted between said camming surface and said damping means, and ferromagnetic means mounted in said bottom rim and in proximity to said magnet means such that a magnetic field produced by said magnet means surrounds sad ferromagnetic means so that rotation of said magnet means causes rotation of said ferromagnetic means, thereby rotating said upper member.

5. The apparatus of claim 4 wherein said upper member comprises:

an outer rotating element, said outer rotating element including said ferromagnetic means, and annular, nonmagnetic means mounting said ferromagnetic means;

an inner rotating element;

outer bearing means attached to said inner rotating element and supporting said outer rotating element said outer bearing means comprising said upper damping means;

an upper shaft rotatably and slidably mounted to said frame, said upper shaft having a lower portion, and said second axis comprising a central longitudinal axis of said lower portion;

inner bearing means slidably mounted to said lower portion and rotatably supporting said inner rotating element; and means for biasing said inner bearing means downwardly along said lower portion such that said ferromagnetic means is urged against said camming means.

6. The apparatus of claim 5 wherein said lower member comprises:

a lower disk having said magnet means about its periphery, an inner disk having an outer periphery abutting said magnet means, and washer means defining said camming surface;

a cup-shaped disk located beneath and supporting said lower disk;

mounting disk means having an upper surface defined by said lower damping means and a cylindrical portion having a central longitudinal axis which defines said first axis, said mounting disk means attached to and supporting said cup-shaped disk; and upper bearing means for rotatably mounting said cylindrical portion to said frame.

7. The apparatus of claim 6 wherein said magnet means comprises a plurality of magnet elements spaced about said periphery of said inner disk, said magnet members being arranged in alternating polar orientation, and said ferromagnetic means comprises a ring defining a plurality of radially extending slots substantially evenly spaced about said ring.

8. The apparatus of claim 7 wherein said upper shaft is offset from said first axis.

9. The apparatus of claim 3 wherein said upper member comprises:

upper non-metallic damping means isolating said bottom rim from the remainder of said upper member;

at least one pair of opposing post members extending outwardly from said upper member, said posts extending radially from said second axis on a common diameter;

a top cylinder;

a bottom cylinder member having said bottom rim;

said upper damping means joining said top cylinder member to said bottom cylinder member;

an upper shaft rotatably mounted in said frame and having a lower portion rotatably journaled into said top cylinder member; and means for rotating said upper shaft relative to said frame.

10. The apparatus of claim 9 wherein said means for driving said upper member includes at least one pair of studs extending upwardly from said camming surface and positioned thereon along a common diameter, said studs engaging said opposing post members and spaced on equal distance from said first axis.

11. The apparatus of claim 10 wherein said means for rotating said upper shaft includes:
   bearing means for receiving an upper portion of said first upper shaft, said bearing means rotatably mounted in said frame;
   a sprocket wheel rigidly mounted to an upper portion of said bearing means;
   a master sprocket wheel rotatably mounted to said frame; and
   belt means extending about said sprocket wheel and said master sprocket wheel such that rotation of said master sprocket wheel causes said sprocket wheel to rotate thereby causing said upper shaft to rotate relative to said frame and said point of engagement to be revolved about said first axis.

12. The apparatus of claims 1 or 11 further comprising:
   a second lower member having a second camming surface and mounted to said frame to rotate about a third axis substantially parallel to said first axis;
   said second lower member including second lower non-metallic damping means isolating said second lower camming surface from the remainder of said second lower member;
   a second upper member positioned above said second lower member and mounted to said frame to rotate about a fourth axis substantially parallel to said second axis;
   said second upper member including a second bottom rim, a portion of which engages said second camming surface at a point thereon;
   means for rotating said second lower member about said third axis in a direction opposite to that of said upper member and said lower member; and
   means carried by said second lower member for driving said second upper member such that rotation of said second lower member by said rotating means causes said upper member to rotate about said second axis in the same direction as said second lower member, thereby creating unbalanced centrifugal forces which result in a second linear force substantially normal to said third axis.

* * * * *